2 Sheets--Sheet 1.

T. W. MINTER.

Engraving and Carving Machines.

No. 5,458. Reissued June 17, 1873.

Witnesses:
Ernst Bilhuber
Chas Wahlers.

Inventor:
Thomas W. Minter
by Van Santvoord Mauff
his Attys.

2 Sheets--Sheet 2.

T. W. MINTER.

Engraving and Carving Machines.

No. 5,458. Reissued June 17, 1873.

Witnesses:
Ernst Bilhuber
Chas. Wahlers.

Inventor:
Thomas W. Minter
by Van Santvoord & Haff
his attys

UNITED STATES PATENT OFFICE.

THOMAS W. MINTER, OF NEW YORK, N. Y.

IMPROVEMENT IN ENGRAVING AND CARVING MACHINES.

Specification forming part of Letters Patent No. 132,594; dated October 29, 1872; reissue No. 5,458, dated June 17, 1873; application filed April 25, 1873.

*To all whom it may concern:*

Be it known that I, THOMAS W. MINTER, of the city, county and State of New York, have invented a new and useful Improvement in Engraving and Carving Machines; and I do hereby declare the following to be a full, clear, and exact description thereof, which will enable those skilled in the art to make and use the same, reference being had to the accompanying drawing forming part of this specification, in which drawing—

Figure 1:
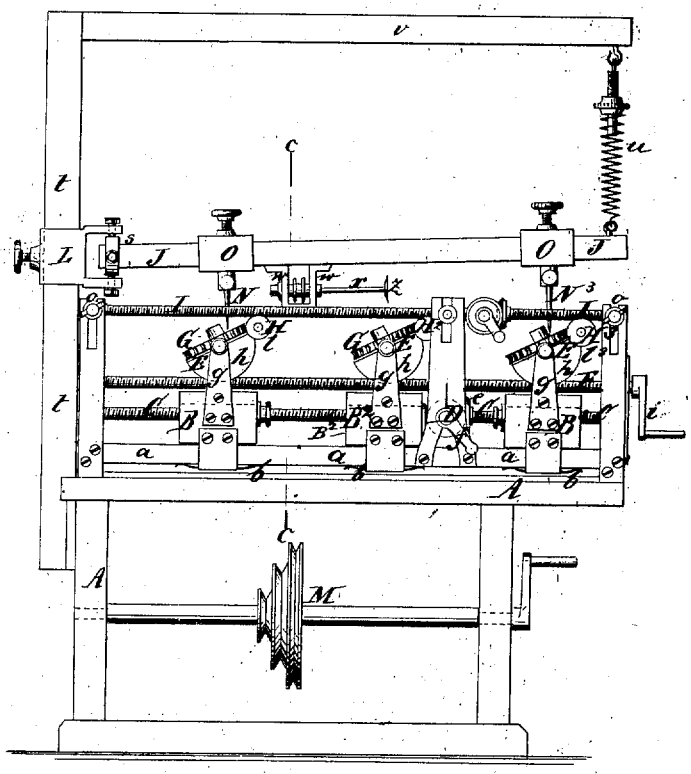
Figure 2:
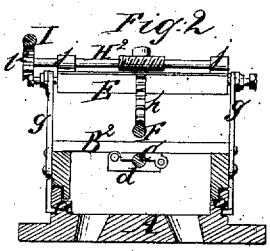
Figure 3:
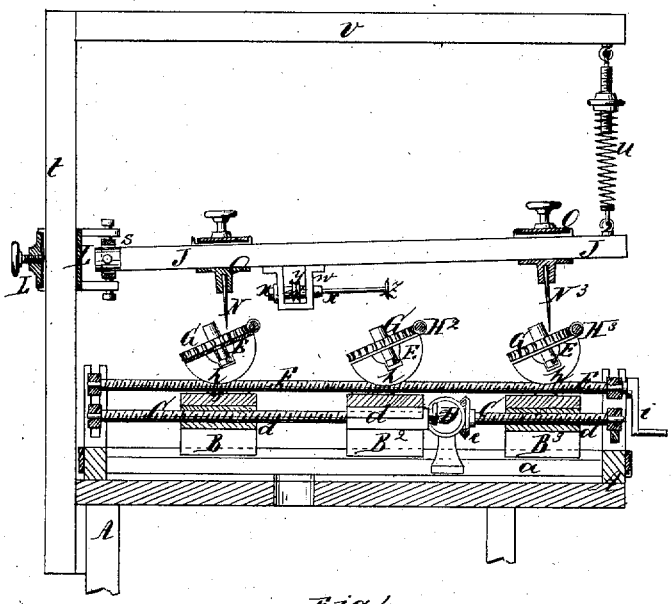
Figure 4:
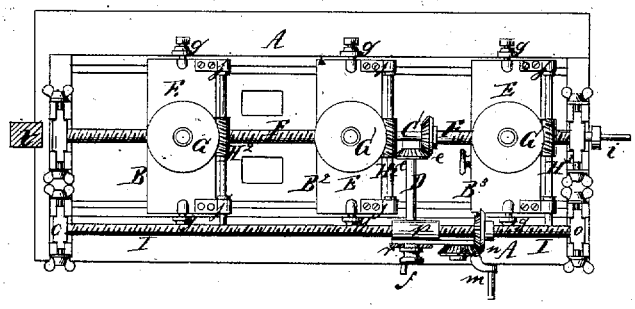

Figure 1 represents a side elevation of my invention. Fig. 2 is a partial transverse section of the same in the plane *c c*, Fig. 1. Fig. 3 is a longitudinal vertical section of the same. Fig. 4 is a top view of the same, partly in section. Similar letters indicate corresponding parts.

This invention relates to a new machine for engraving and carving, die-sinking, cameo and intaglio-cutting, and similar fine and delicate work in stone, steel, or other material, with the object of producing exact and artistic imitations of suitable designs.

The engraving machines now in use, or heretofore proposed, are not adapted to the finest kind of work nor to the employment of all the tools necessary for fine workmanship. At present, for example, the process of seal-engraving and cameo-cutting is carried out on a lathe with the use of over a hundred different tools of such various shapes and kinds that the work can be ground away as fine as it is possible to do with the aid of magnifying glasses.

By my invention I desire to be able to use all the tools and let them work more or less automatically to copy any given design or pattern at an enlarged or reduced scale, but with as much truth and exactitude as could scarcely be attained by the most skillful artist. A steady man, but less experienced, will then be enabled to produce as good or better workmanship as that, for which, thus far, more experienced and higher-priced hands had to be employed.

My invention consists, first, in the arrangement in an engraving or carving machine, of a cutter-wheel carrying spindle which extends across the surface of the work and has a swinging motion over such surface in a plane parallel to the same or nearly so, in such a manner that the cutter is made to act on the work at a point at right angles or nearly so to the direction of its spindle. With this spindle is combined a vibrating beam and a tracing-pin, so that while the tracing-pin can be made to follow the lines of the pattern, the spindle is revolved by belt-connection the same as a lathe-spindle, and the cutter-tool can be used to the very same advantage as that to which it is at present used on the lathe only. The pattern and the work are fastened upon platforms which can be tilted into any suitable inclined position, and by these means the angle at which the tool strikes the work can be changed, and a great variety of incisions can be produced, not only straight up or down, as in the present engraving-machines, but also inclined, rounded, &c., as may be necessary for the making of reliefs for cameos or depressions for intaglios. The mechanism for inclining the pattern and the work is so united that both will receive exactly the same motion, and offer the same angle of surface to the tracing-pin and the tool, respectively. Said mechanism consists of worm-wheel segments applied to the platform supporting the pattern and the work, and meshing both into the thread of an endless screw, which, when turned, brings the platforms to the desired position. With said platforms are combined disks and worm-gears for the purpose of imparting to the same a uniform revolving motion. Said platforms are also longitudinally adjustable, and the nuts which embrace the longitudinally-adjusting screw are jointed, so that it will accommodate itself automatically to the varying height of the platforms during this tilting motion.

In the drawing, the letter A represents the supporting frame of my improved engraving-machine. This frame is preferably made in form of a table, of wood or other material, and of sufficient strength to support the several parts of the machine during operation. *a a* are two horizontal rails rigidly affixed to the frame and parallel to each other. They serve as supports for three carriages, B, $B^2$, and $B^3$, which are all of equal size and style, at least preferably so, and which are or may be made to partly embrace the rails, as indicated in Figs. 1 and 2, with friction-rollers or springs *b* bearing against the lower edges of the rails to facilitate the longitudinal adjustment of the carriages. Each carriage is provided with a nut, *d*, made in two parts, which are hinged together, as is indicated in Fig. 2. A longitudinal screw, C, which has its bearings in the ends of the frame, passes through all the nuts *d*, so that all the three carriages will be simultaneously moved in the same direction and with equal speed, whenever the screw is turned. A crank-handle for turning it may be directly applied to the end of the screw, or the latter may be by bevel-gear wheels *e e* be brought in connection with a transverse shaft, D, which carries a crank-handle, *f*. Every carriage contains a platform, E, pivoted at its ends in brackets *g g*, which project from the carriage. A segment, *h*, is affixed to the under side of every pivoted platform E, and has a worm-thread cut into its edge, which is in gear with another longitudinal screw, F, whose bearings are in the ends of the frame A. All three platforms and their segments being alike, the effect of the screw F, when turned, will be the same on all, tilting or inclining them simultaneously, and at an equal degree. A crank-handle, *i*, on the screw F, is used to turn it. To the upper surface of every platform E is applied a swivel disk or plate, G, with a worm-thread around its periphery. Transverse screws H $H^2$ $H^3$, hanging in ears *j j*, which project from the several platforms, are in gear with the disks or plates G, respectively. Worm-wheels *l*, $l^2$, and $l^3$, mounted upon the ends of the transverse screws H $H^2$ $H^3$, are in gear with a third longitudinal screw, I, whose bearings are in the end of the frame A. When the screw I is turned by means of a handle at its end or by a handle, *m*, Figs. 1 and 4, whose arbor connects by bevel-wheels *n n* with the screw I, all the three screws H, $H^2$, and $H^3$ will be turned in equal ratio, and all the three disks G by them in equal degree. When by means of the screw F the three platforms E are more or less tilted on their carriages, the plane of the screws H, $H^2$, and $H^3$ will become changed, and it is therefore necessary, as these screws should remain in gear with the screw I, to make the bearings *o o* of the screw I vertically adjustable in their slotted supports. When the crank-handle *m*, Figs. 1 and 4, is used at right angles to the screw I, it too should be made vertically adjustable by being hung in a sleeve, *p*, which loosely embraces the screw I, and finds guidance in the slotted upright *r* of the frame A.

From the foregoing it will be clear that, by means of the screw C, all three carriages are simultaneously adjusted in longitudinal direction; by means of the screw F all three platforms are simultaneously tilted; while by the screw I all three disks G will be equally and simultaneously turned. The disks being part of the platforms, and these again part of the carriages, the longitudinal adjustment of the latter will be shared in by all the platforms and disks, and the tilting of the platforms shared in by the disks. Whenever the distances between the several carriages are to be varied, the hinged-nuts *d* are swung open and thereby liberated from the screw C, so that the change of position can be effected, whereupon the nuts are reclosed. J is a beam, pivoted in a ring, *s*, which is pivoted in ears of a vertically-adjustable slide, L, embracing a post, *t*, of the frame A. The free end of the beam J is suspended by a spring, *u*, from a horizontal arm, *v*, of the frame A. In a bracket, *w*, which is fastened to the under side of the beam, are the bearings of a spindle, *x*, which carries a pulley, *y*, and is prepared for the reception of the cutting-tool *z* in the manner in which spindles are usually prepared for the reception of such tool. The spindle can be revolved by a belt connection with a driving-shaft, M, operated upon by means of a treadle, or otherwise. From the beam are also suspended two vertical pins, N and $N^3$, which are attached to slides O, adjustable on the beam J, and applied above the carriages B and $B^3$, respectively.

The pattern to be imitated is secured upon the disk G of the carriage $B^3$, if its copy is to be reduced in size; or upon the disk G of the carriage B, when the copy is to be larger than the original.

The metal, stone or other material to be cut, is fastened upon the middle disk G. The several disks are, by preference, provided with tubular projections for the reception of pieces of wood, upon which the patterns and material to be cut can be fastened. When every thing is in place the screws C, F, and I are properly turned by the attendant to bring every part of the pattern surface in contact with the tracing-pin N or $N^3$, which is suspended from the beam J. The cutting-tool will then also be raised and lowered in conformity with the design to be cut, and will produce such design on the material under it.

The machine may be made with but two carriages and their appendages, when either no enlargement or no reduction is desired, or when the bracket *w* is made adjustable on the beam or the beam reversible.

In order to enable the fastening of each platform in its tilted position, while being longitudinally adjusted, in which case the screw F must be lowered to permit such longitudinal adjustment, and would consequently cease to support the platforms in their tilted positions, a slotted arch or plate should be applied to the end of each platform, to be fastened by a set-screw to the bracket *g* next to it.

From this description it will be seen that in my machine the spindle *x*, which carries the tool, extends across the surface of the work, and can be swung in a plane parallel to said surface, or nearly so, and that the tool acts on the work at a point at right angles, or nearly so, to the direction of the spindle.

By this arrangement of the tool-carrying spindle, I am enabled to produce lines of every desirable kind, the tool acting on the work in the same manner as it does in the ordinary lathe; but there is the difference, that in my machine the tool is caused to traverse over the surface of the work according to the lines of the pattern, while in the ordinary lathe the tool has simply a revolving motion, and the work must be moved to cause the tool to follow the required designs.

By combining with this traversing tool-carrying spindle a work-supporting platform, which can be brought in an inclined or horizontal position, the variety of lines to be produced is still further increased, since the same tool will produce different lines according to the angle under which it acts upon the work.

What I claim as new, and desire to secure by Letters Patent, is—

1. In an engraving or carving machine the arrangement of a spindle carrying a cutter-wheel, substantially as described, and having a swinging or traversing motion over the work upon a plane parallel to the same, or nearly so, essentially in the manner and for the purpose specified.

2. The combination of a tracing-pin and pattern-supporting platform, with a tool carrying spindle extending over the surface of the work, and having a traversing motion over said surface in a plane parallel to the same, or nearly so, substantially as set forth.

3. The vibrating beam, J carrying the tracing-pin and the bracket *w*, which forms the bearings of the tool-carrying spindle, substantially as herein shown and described.

4. The rotary disks G G, applied to the platforms E E, and combined with the transverse-screws H $H^2$, to be turned simultaneously by means of a single screw, I, as set forth.

5. The tilting platform E, applied to an engraving machine, substantially as and for the purpose herein shown and described.

6. The worm-segment *h*, applied to the pivoted platform E, for connecting the same with the tilting-screw F, substantially as specified.

7. The nuts *d d*, on the carriages B and $B^2$, when made jointed and hinged, substantially as described.

8. The screw I for moving the transverse-screws H and $H^2$, when made vertically self-adjusting to adapt itself to the varying positions of said transverse screws, while the platforms are being tilted, substantially as specified.

9. The combination of the three longitudinal-screws C, F, and I with the carriages B $B^2$, platforms E E, disks G G, and transverse screws H $H^2$ substantially as herein shown and described.

10. An engraving-machine employing a rotary cutter on a vibrating beam above a platform, adjustable substantially in the manner specified.

THOMAS W. MINTER.

Witnesses:
W. HAUFF.
E. F. KASTENHUBER.